Dec. 27, 1960  E. C. PRICE  2,966,274
POWERED VEHICLE RAMP

Filed July 17, 1958  3 Sheets-Sheet 1

INVENTOR.
EDWIN CARL PRICE
BY
*Darby & Darby*
ATTORNEYS.

Dec. 27, 1960        E. C. PRICE        2,966,274

POWERED VEHICLE RAMP

Filed July 17, 1958        3 Sheets-Sheet 2

INVENTOR.
EDWIN CARL PRICE
BY
Darby & Darby
ATTORNEYS.

Dec. 27, 1960  E. C. PRICE  2,966,274
POWERED VEHICLE RAMP
Filed July 17, 1958  3 Sheets-Sheet 3
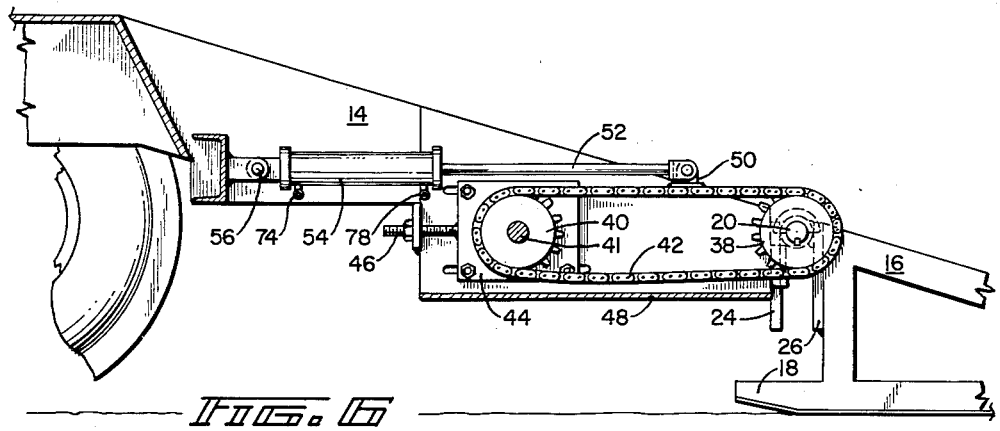
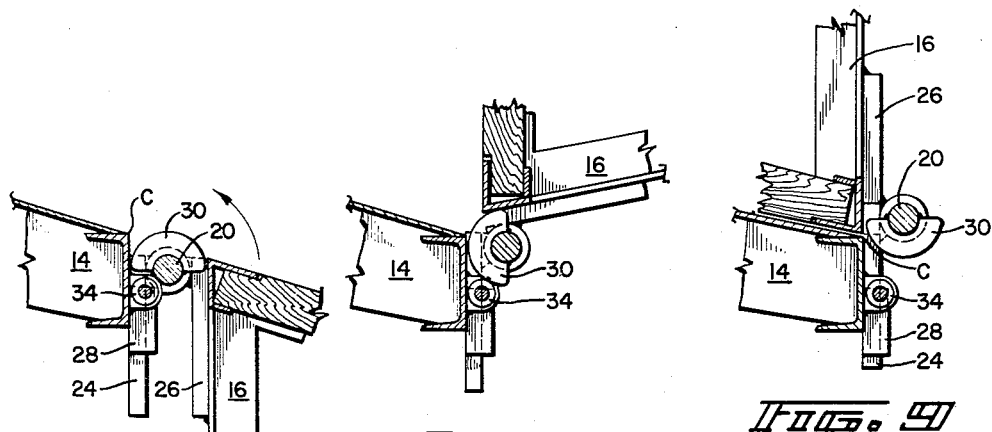
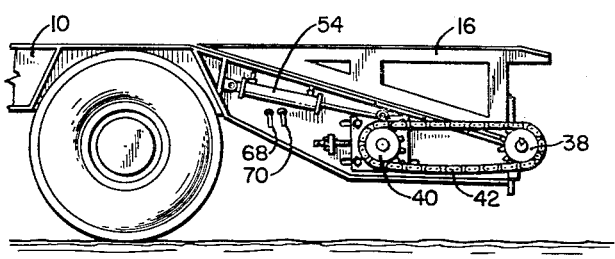
INVENTOR.
EDWIN CARL PRICE
BY
*Darby - Darby*
ATTORNEYS.

United States Patent Office 2,966,274
Patented Dec. 27, 1960

2,966,274
POWERED VEHICLE RAMP

Edwin Carl Price, Angola Road, Cornwall, N.Y.

Filed July 17, 1958, Ser. No. 749,164

2 Claims. (Cl. 214—85)

The main object of this invention is to provide a built in vehicle ramp to provide a loading and unloading runway.

An important object of the invention is to provide a ramp which is in part an extension of the vehicle body pivotally mounted thereon in two sections and provided with individually controlled power means for folding and unfolding the ramp and adapting it to uneven surfaces.

Still another object of the invention is to provide in such a combination means whereby the ramp can be completely folded onto the vehicle body to form an extension thereof, completely unfolded to provide a loading and unloading runway, or to provide for positioning and holding the ramp sections in various intermediate positions.

Other and more detailed objects of the invention will be apparent from the embodiment thereof selected for illustrative purposes herein, and shown in detail in the accompanying drawings.

In the drawings:

Figure 6 is a cross-sectional view taken on the line 6—6 of Fig. 4;

Figures 7, 8 and 9 are detailed cross-sectional views illustrating the ramp supporting hinge action in open, intermediate and closed positions, respectively;

Figure 11 is a side elevational view of a modified arrangement of the power operator for one of the ramp sections.

The subject matter of this invention is an extension of the vehicle loading ramp structure of my Patent No. 2,437,479, issued March 9, 1948, wherein the foldable ramp is in the form of a single frame, manually operable from closed to open position.

Experience with the structure of said patent has demonstrated that the hinged ramp when made strong enough for ordinary use is rather heavy to be handled manually, and in addition, because it is in a single section, it is not as universally useful as a double section ramp such as herein disclosed.

The rear end of a vehicle body of any suitable construction is illustrated at 10, provided with a pair of overhanging, downwardly inclined integral frame extensions 14 and 15 extending rearwardly of the wheel assembly 12. These extensions are commonly known as "beaver tails."

Figure 1:
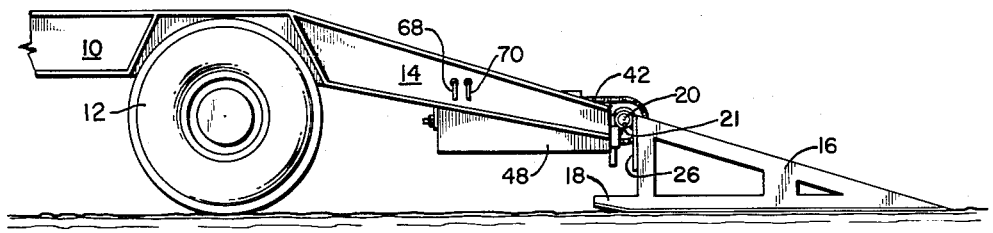
Figure 1 is a side elevational, diagrammatic view of the rear end of a truck body showing the powered ramp in the case illustrated in two sections extended for loading and unloading the vehicle.
Figure 2:
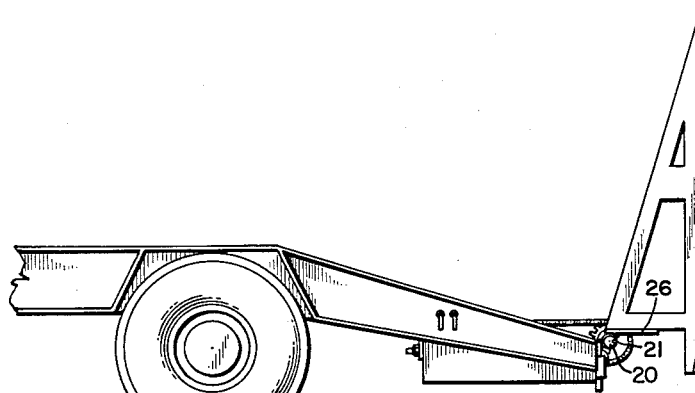
Figure 2 is a similar view showing the ramp locked in vertical position.
Figure 3:
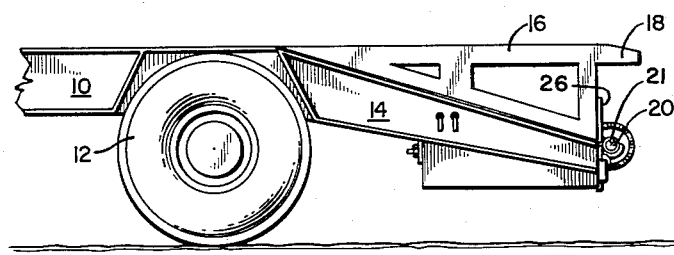
Figure 3 is a similar view showing the ramp completely folded and forming a deck level extension of the truck platform.
Figure 4:
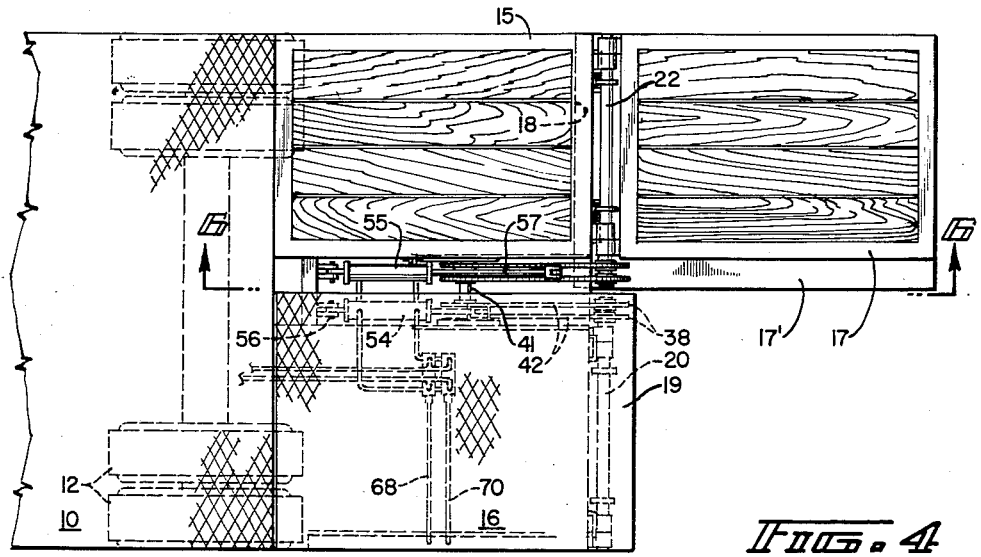
Figure 4 is a plan view of the structure of the invention showing one ramp section fully extended and the other completely closed.
Figure 5:
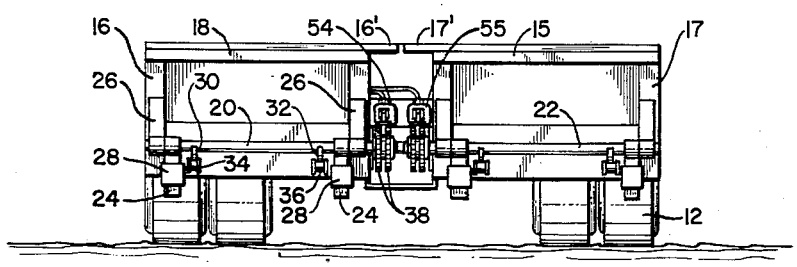
Figure 5 is a righthand end elevational view of the structure as shown in Fig. 3.

As is illustrated in Figs. 1 and 4, the rear ends of the "beaver tails" have pivotally mounted thereon a pair of ramp sections 16 and 17 in the form of built-up structural frames suited to the purpose. The usual "beaver tail" forms a continuous platform transversely of the vehicle body but in accordance with this invention it is subdivided into two sections 14 and 15, which are aligned with the sides of the vehicle body on the outside, but are of reduced width so as to provide a longitudinally extending space therebetween, as clearly shown in Fig. 4. The foldable ramps 16 and 17 are of the same width as the "beaver tails," and likewise, provide between them a space aligned with the space between the "beaver tails." In order to close the space between the "beaver tails" when the ramps are folded, they are each provided with juxtaposed lateral extensions 16' and 17' respectively, so that when the ramps are closed, as shown in Fig. 3, the platform extension for the vehicle body which they provide is substantially closed, as is clear from Fig. 5. Each of the ramps, as shown for example in Figs. 3 and 4, is provided when closed with a rearward extension 18 and 15 respectively, to provide bumper protection for the driven sprockets, to be described later when backing the vehicle against a loading platform or the like.

Each of the ramps 16 and 17 is pivotally supported on the respective "beaver tails" 14 and 15 by means of the shafts 20 and 22, each supported at their respective ends by hinge structures which are the same. These hinge structures will be described in connection with ramp 16, it being understood that those for the ramp 17 are of the same construction.

Each hinge consists of a sufficiently rugged bearing member 26 attached to the end of the ramp 16 in which one end of shaft 20 is secured by a key 21, and a cooperating bearing member 24 which is slidably mounted in a similarly shaped socket member 28 secured at the end of the "beaver tail" 14. The shaft 20 rotates in the bearing members 24. Secured in any suitable manner, as by welding to the shaft 20, adjacent each hinge, are the cams 30 and 32 which cooperate with fixed abutments 34 and 36 firmly attached to the end of the "beaver tail" 14.

Secured on the inner end of the shaft 20 are a pair of driven sprockets 38 which cooperate with a chain 42 engaged by sprockets 40, see Fig. 6, which are rotatably mounted on a shaft 41 but are not keyed to it. The shaft 41 is supported at its ends by a pair of plates, of which the plate 44 in Fig. 6 is one. These plates are adjustably mounted by means of bolts operating in slots in a housing 48 and are provided with threaded extensions 46 which have cooperating nuts so that the plates 44 can be adjusted in forward or backward positions to properly tension the chains and then be locked with their bolts, all as is clear from Fig. 6. At this point it may be noted that with respect to both ramps the sprockets 38 and 40 and the chains 42 are in duplicate to provide the necessary amount of strength for the job to be done, which feature is not of the essence of this invention.

Attached to the top flights of each pair of chains 42 are the fixtures 50 which are respectively connected to the piston rods of fluid pressure cylinders of which piston rod 52, in Fig. 6, is an example. This piston rod cooperates with a cylinder 54 which is pivotally mounted at 56 on a frame member of the truck. The piston rod is also pivotally connected to the fixture 50. At this point it might be well to again note that the description for half the mechanism, that is for one of the ramps, is the same for both ramps. However, for the sake of future description it is noted that the other engine is indicated by the reference character 55, see Fig. 4.

Figure 10:
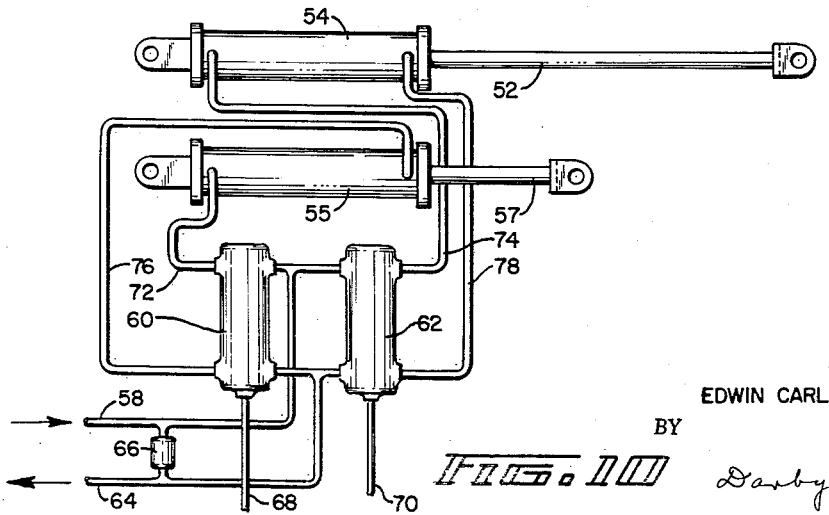
Figure 10 is a somewhat diagrammatic view of the fluid motor control system for the ramps.

The fluid pressure circuit for the engines 54 and 55 is diagrammatically illustrated in Fig. 10. A pressure fluid supply pipe 58 from any suitable source, mounted on the vehicle and not shown, is connected to both of the hydraulic valves 60 and 62. Pressure fluid supply leads 72 and 74 extend from these valves to the corresponding ends of the respective cylinders 55 and 54. The other ends of these cylinders are also connected respectively by the lines 76 and 80 to the valves 60 and 62. A common exhaust line 64 is also connected to these valves as shown. The supply and exhaust lines 58 and 64 are cross-connected by an adjustable by pass valve 66. The control valves 60 and 62 are provided with manual actuators 68 and 70 respectively. These valves are commercially available and are of a type which through the actuation of the control rods 68 and 70 provide for forward and reverse movement of the engines, as well as the locking of the engines in any position between their extremes of movement, as will be explained later.

This mechanism operates as follows: Assuming for the start of the description that the two ramps 16 and 17 are closed, as shown for ramp 16 in Fig. 3, and it is desired to fully open the ramps to the position shown in Fig. 1, the operator manipulates the controls 68 and 70 for the valves 60 and 62, so as to supply fluid under pressure from the source through the pipe 58 to the input ports of the valves. From there the fluid flows through the pipes 72 and 74 to the lefthand ends of the cylinders 55 and 54 of the engines. This causes their piston rods 52 and 57 to move to the right, discs 4 and 10 driving the chains 42 towards the right, Fig. 6, causing the ramps to unfold. The starting position of the ramps when closed is illustrated in Fig. 9 and as they open out they pivot on the corner C "beaver tail" until they are opened far enough so that they can drop down through sliding connection between the plates 24 of the hinges and their clutches 28, causing the cams 30 to engage the fixed abutments 34. These cams are concentric with the shafts on which they are mounted and provide rolling support for the ramps until they disengage the abutments 34. During the period of engagement of the cams with the abutments the plates 24 of the hinges are in intermediate position, see Fig. 8, that is below their raised position, see Fig. 9, when the pivoting occurs at the corner C. When the cams 30 disengage abutments 34 during opening the hinge plates 24 drop all the way down in their sockets 28, to the position shown in Fig. 7.

The supply of fluid to the cylinders continues until the ramps are in fully opened position, after which the valves may be shut off by their control rods. The ramps are individually driven by separate engines so that in the event the ground is uneven for example, the ramps can assume different levels within practical limits.

In closing the ramps from fully opened position the valves 60 and 62 are operated by their control rods to supply pressure fluid to the other ends of the engines through the pipes 76 and 78. In both the opening and closing movements fluid from the inactive ends of the cylinders are returned through the valves 60 and 62 to the exhaust line 64. Valves 60 and 62 are of a type as is well understood in this art such that the ramps can be locked in any position intermediate fully closed or fully opened position when conditions require, as for example if a tractor is run up on the truck body and overhangs the "beaver tail," so that the ramps cannot be fully closed.

As is well understood in the art, the by pass valve 66 can be adjusted so that any excess pressure in the supply line 58 can be by passed back to the exhaust line 64 when conditions require it.

In closing the ramps when pressure fluid is supplied to the righthand ends of the engines, Figure 10, the engine piston rods being to retract or move to the left, Fig. 10, starting to lift the ramps. Shortly after lifting begins the corners of the cams 30 which are rounded as shown, engage fixed abutments 34, raising the plates 24 of the hinges from the position of Fig. 7 to the intermediate position shown in Fig. 8. The closing movement of the ramps continues with the hinge parts in this position until the rear corners of the ramps engage the corners C of the frame members of the "beaver tails" so that the ramps pivot around these corners from then on to fully closed position, during which period the cams 30 are raised away from the abutments 34 and the plates 24 slide to their uppermost position, Fig. 9, in the clutches 28.

The purpose of the sliding movement of the hinges on the "beaver tails" is to keep all of the pivoting structure below the plane which includes the top surface of the "beaver tails" and the top surfaces of the ramps, as is clear from Fig. 7. This is with the exception of the cams which project slightly so that there will be a minimum of interference between the equipment being loaded and this hinge structure. The sprockets 38 and the cooperating chains are covered at the longitudinal center of the vehicle body so that most types of equipment such as tractors which have clearance at the center will not engage them during the loading operation.

In Fig. 11 is shown a modification involving a slight rearrangement of the parts, wherein the "beaver tail" frame is of a different configuration with the result that the engines, as for example the engine 54, is pivotally attached at a point above the plane of the top flights of the chains 42. This distinguishes from the structure of Fig. 6 for example, where they are in the same plane.

From the above description it will be apparent to those skilled in the art that the details of this invention are capable of some variation without departure from the novel subject matter herein disclosed. It is preferred, therefore, that the scope of protection be determined by the appended claims rather than be limited to the specific embodiments illustrated herein.

What is claimed is:

1. In combination a vehicle chassis having a platform, a ramp having a shaft connected thereto, bearing means for rotatably supporting said shaft on the rear end of said chassis, reversible power means connected to said shaft, means for controlling said power means to swing said ramp in opening and closing directions, said ramp when fully opened forming an inclined surface extension of said platform to ground level, means on the end of said platform for supporting said bearing means for vertical sliding movement on the platform, and means for causing such sliding movement during opening and closing of said ramp so that it clears the adjacent end of the platform.

2. In combination a vehicle chassis having a platform, a ramp having a shaft connected thereto, bearing means for rotatably supporting said shaft on the rear end of said chassis, reversible power means connected to said shaft, and means for controlling said power means to swing said ramp in opening and closing directions, said ramp when fully opened forming an inclined surface extension of said platform to ground level and said bearing means including members mounted on the end of said chassis for supporting said shaft for vertical sliding movement on said chassis and cooperating means on said chassis and shaft to effect such sliding movement to raise and lower the ramp with respect to the adjacent end of the chassis as a result of and during its movement of opening and closing.

References Cited in the file of this patent
UNITED STATES PATENTS

| | | |
|---|---|---|
| 2,587,265 | Wright | Feb. 26, 1952 |
| 2,727,781 | D'eath | Dec. 20, 1955 |
| 2,750,226 | Ash | June 12, 1956 |